United States Patent
Batalaris et al.

(10) Patent No.: US 6,193,310 B1
(45) Date of Patent: Feb. 27, 2001

(54) CHILD CAR SEAT ADAPTED FOR FRONTWARD AND REARWARD FACING CONFIGURATIONS

(75) Inventors: George Thomas Batalaris, Beavercreek; Danny C. Bowles, St. Paris; Kelly Goodwin, Ansonia; Tracy George, Huber Heights; Will Gibson, Kent; Joseph J. Kelly, Mason; Sherry Mescher, Brookville; Herman Shie, Union; John Winand, Troy; Tom Witman, Huber Heights, all of OH (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/421,649

(22) Filed: Oct. 20, 1999

(51) Int. Cl.$^7$ .................................................. A47C 1/08
(52) U.S. Cl. ...................................... 297/253; 297/256.14
(58) Field of Search ............................... 297/256.14, 253

(56) References Cited

U.S. PATENT DOCUMENTS

| | | | |
|---|---|---|---|
| Re. 29,841 | * 11/1978 | Wener | 297/253 X |
| 2,664,140 | * 12/1953 | Kindelberger | 297/253 X |
| 4,345,791 | * 8/1982 | Bryans et al. | 297/256.14 |
| 4,613,188 | * 9/1986 | Tsuge et al. | 297/256.14 X |
| 4,913,490 | * 4/1990 | Takahashi et al. | 297/256.14 |
| 5,458,398 | 10/1995 | Meeker et al. | |
| 5,487,588 | 1/1996 | Burleigh et al. | |
| 5,918,934 | 7/1999 | Siegrist | |
| 6,000,753 | 12/1999 | Cone, II | |

* cited by examiner

Primary Examiner—Anthony D. Barfield
(74) Attorney, Agent, or Firm—Thompson Hine & Flory LLP

(57) ABSTRACT

A child car seat is configured for attachment to vehicle anchor points in at least two configurations including a frontward facing configuration and a rearward facing configuration. The child car seat includes an exterior portion and an interior portion, the interior portion defining a receiving area for a child. A front area of the interior portion is generally open and a rear area of the interior portion is generally closed by a back section. A first structure is positioned on the interior portion for securing a first strap thereto such that the first strap is positioned interiorly of the seat and is capable of extending both toward the front area and the rear area, and a second structure is positioned on the interior portion for securing a second strap thereto such that the second strap is positioned interiorly of the seat and is capable of facing both toward the front area and the rear area.

13 Claims, 6 Drawing Sheets

CHILD CAR SEAT ADAPTED FOR FRONTWARD AND REARWARD FACING CONFIGURATIONS

TECHNICAL FIELD

This invention pertains generally to infant or toddler car seats, as well as hybrid booster seats, and more specifically to such seats which are adapted for facing in both a frontward or rearward direction and which are capable of being connected to anchor points provided in vehicles.

BACKGROUND OF THE INVENTION

As used herein the terminology "child car seat" refers to car seats for children of all ages, including infants and toddlers, and likewise includes car seats commonly referred to as hybrid booster seats or booster seats. The term "vehicle seat" is used to refer to the back or front seat of any vehicle type, including, but not limited to cars, vans, minivans, trucks, and sport utility vehicles.

A typical child car seat is secured to a vehicle such as an automobile with the vehicle seat belt. Under one standard procedure, the vehicle seat belt passes through two opposed openings in the side rails of the child car seat and behind the rear of the seating surface of the seat. In the usual construction of these seats, the two openings are not connected and offer no support or "path" for the vehicle seat belt as it passes from one opening to the other opening.

As an alternative, a child car seat having a recessed area in the back through which the vehicle seat belt passes is provided in U.S. Pat. No. 5,458,398. Apertures in the left and right sides of the recessed area allow the vehicle seat belt to be threaded through one opening, pass across the recessed area, and exit through the other opening. The recess is partially covered with a fixed molded panel, leaving a restricted opening at the bottom of the recessed belt path sufficient to allow the vehicle seat belt to be threaded from the front of the seat. The padded covering of the seat has a slit adjacent the opening of the bottom of the belt path so as to provide access to the belt path when the automobile seat belt is threaded therethrough.

In newer model vehicles, vehicle seats are being constructed to better facilitate connection of child car seats. For example, new standards are being promulgated which will require the back seats of vehicles to include anchor points for attaching child car seats. These anchor points are intended to provide more stable attachment of such seats. Accordingly, new child car seat constructions must be developed in order to best take advantage of such anchor points.

SUMMARY OF THE INVENTION

In one aspect of the present invention, a child car seat is configured for attachment to vehicle anchor points in at least two configurations including a frontward facing configuration and a rearward facing configuration. The child car seat includes an exterior portion and an interior portion, the interior portion defining a receiving area for a child. A front area of the interior portion is generally open and a rear area of the interior portion is generally closed by a back section. A first means is positioned on the interior portion for securing a first strap thereto such that the first strap is positioned interiorly of the seat and is capable of extending both toward the front area and the rear area, and a second means is positioned on the interior portion for securing a second strap thereto such that the second strap is positioned interiorly of the seat and is capable of facing both toward the front area and the rear area. The first and second means may be any one of a number of structures including, but not limited to, pivotably mounted strap end plates, pivotably mounted buckle tongues or buckle boxes, dual buckle tongue assemblies, and dual buckle box assemblies.

In another aspect of the invention, a method of positioning a child car seat in a rearward facing configuration in a vehicle including anchor points is provided. The child car seat includes an exterior portion and an interior portion, the interior portion defining a receiving area for a child. A front area of the interior portion is generally open and a rear area of the interior portion is generally closed by a back section. The method involves attaching a first strap to the interior portion of the child car seat, and attaching a second strap to the interior portion of the child car seat. The first strap is routed toward the front area and to a first vehicle anchor point, and the second strap is routed toward the front area and to a second vehicle anchor point. By connecting the straps interiorly on the child car seat and routing them toward the front of the seat, a better torque angle/distance for holding the child car seat in place and preventing rotation of the child car seat is provided.

DETAILED DESCRIPTION

Figure 1:
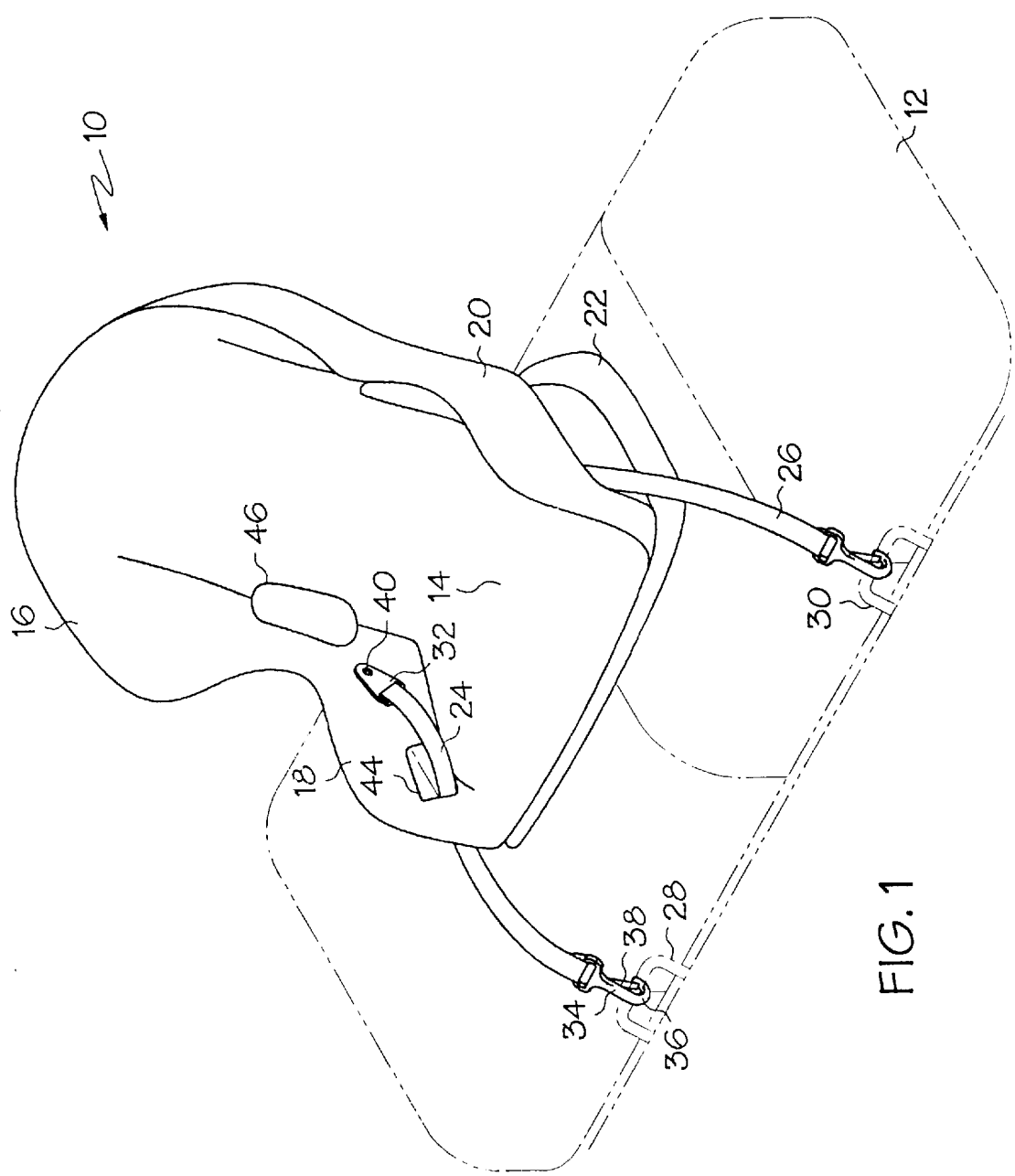
FIG. 1 is a perspective view of one embodiment of an child seat in accordance with the present invention positioned in a rearward facing configuration.

Referring to FIG. 1, a perspective view of one embodiment of a child car seat 10 in accordance with the present invention is shown, illustrating the child car seat in a rearward facing configuration relative to a rear seat portion 12 of a vehicle. The back portion of the vehicle rear seat is not shown in order to facilitate illustration. The child car seat 10 includes a seat portion 14, a back portion 16, and side portions 18 and 20, which collectively define an interior seating area for a child or toddler. A front area 15 of the child car seat is generally open while a rear area 17 of the child car seat is generally closed by back portion 16. The child car seat 10 is mounted to a detachable base 22 as is generally known in the art. However, it is understood that the present invention does not require the use of such a base 22.

Figure 11:
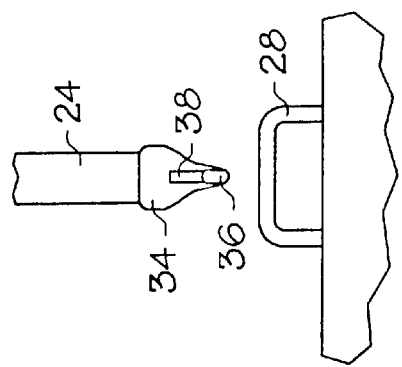
FIG. 11 is a front elevational view of an anchor.

Connected to an interior point of each side portion 18 and 20 of the car seat 10 is a respective securing strap 24 and 26 which is used to secure the child car seat 10 to the vehicle at respective anchors 28 and 30 provided on the vehicle. Referring to securing strap 24, with the understanding that securing strap 26 is similarly configured, a first end of the securing strap 24 is attached to a mount plate 32 which includes an opening therein. The mount plate 32 is pivotally connected through its opening to the interior side of the side portion 18 of the child car seat 10 through use of any suitable means such as pivot pins, nuts and bolts, or any other pivotable connection means, creating pivot point 40. A second end of the securing strap is connected to an attachment hook 34 which is configured to engage the anchor 28. The attachment hook 34 (FIG. 11) may generally include a curved finger portion 36 and resiliently biased retaining clip 38 which in combination form a passage for extending about the anchor 28 in a secure but removable manner. It is recognized that other types of attachment hooks could also be used.

Figure 2:
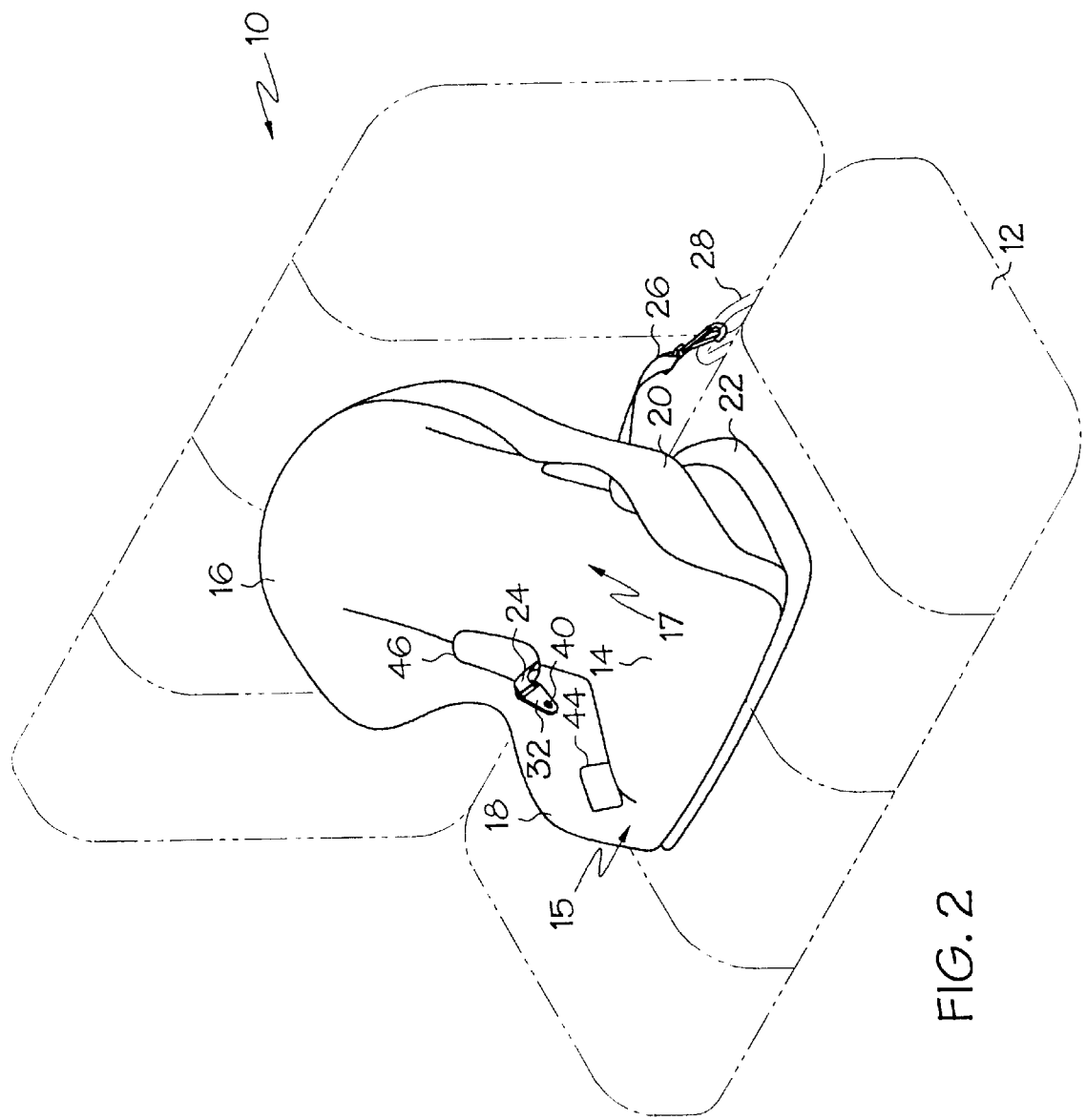
FIG. 2 is a perspective view of the child seat of FIG. 1 when positioned in a frontward facing configuration.

Referring to FIG. 2, the child car seat 10 is illustrated in a frontward facing configuration relative to vehicle rear seat portion 12, with each strap 24 and 26 pivoted to extend in a rearward direction for attachment to anchors 28 and 30. Thus, the pivot point connection 40 provided for securing strap 24 (and securing strap 26) allows each strap to be easily pivoted or rotated about point 40 to enable the child car seat 10 to be attached in either the rearward or frontward facing configurations, utilizing the anchors 28 and 30 for attachment purposes in both configurations, without requiring distinct securing straps for the two different configurations.

Figure 3A:
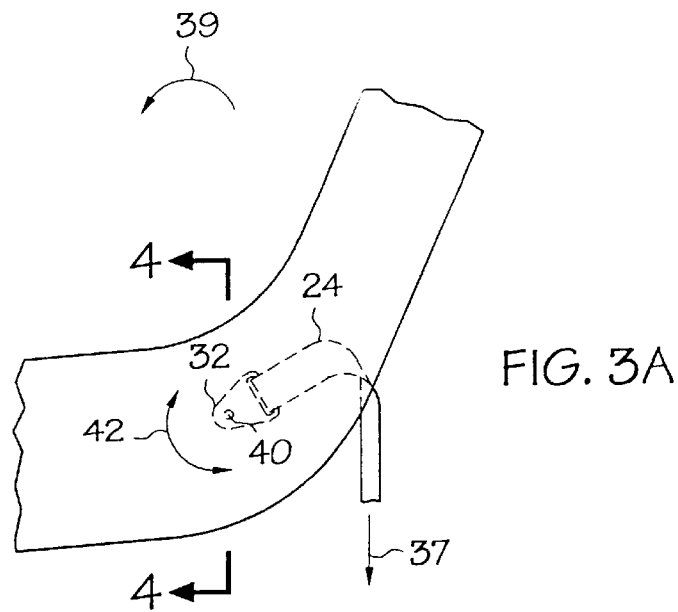
FIGS. 3A–3C are partial side elevational views of the child seat illustrating the pivotable connection between the seat securing strap and the side of the child seat.
Figure 3B:
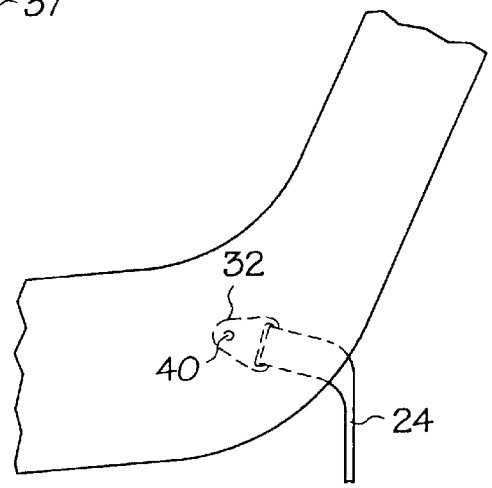
Figure 3C:
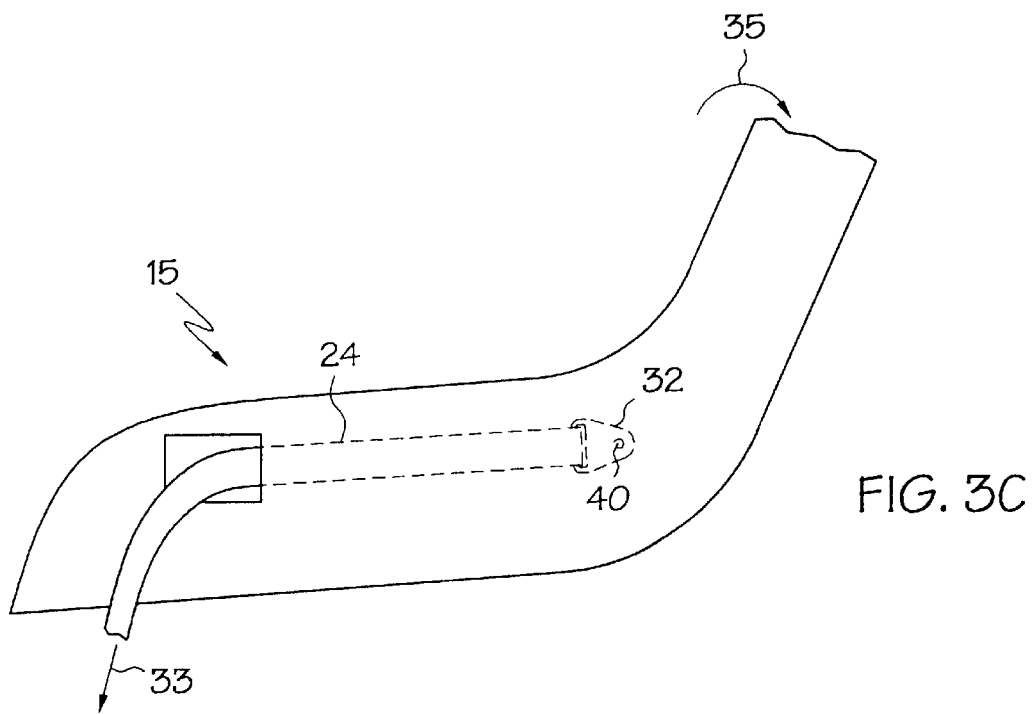

Referring to FIGS. 3A–3C, the pivotable nature of the attachment straps is depicted. In particular, FIG. 3A illustrates a configuration in which attachment strap 24 extends rearward of the child car seat generally as shown in FIG. 2. FIG. 3B illustrates rearward extension of strap 24 in a more downward arrangement. FIG. 3C illustrates frontward extension of strap 24 as generally shown in FIG. 1. It is preferred that each attachment strap 24 be pivotable in 360° of motion as indicated by arrow 42 of FIG. 3A but it is contemplated that less than 360° of pivotable rotation could be suitable for the present invention. For example, rotation or pivot between the rearward extending configuration of FIG. 3A and the frontward extending configuration of FIG. 3C would not require rotation through a full 360°. The strap routings of FIGS. 3A and 3B are representative of a frontward facing installation such as that of FIG. 2, while the strap routing of FIG. 3C is representative of a rearward facing installation such as that of FIG. 1. By routing the strap frontward as shown in FIG. 3C and then down over a front portion of the child car seat, a downward force generally in the direction of arrow 33 is provided to prevent rotation of the child car seat in the direction indicated by arrow 35. Similarly, referring to FIG. 3A, the downward force 37 provided by the strap prevents rotation of the child car seat in the direction indicated by arrow 39.

Referring to FIGS. 1 and 2, the routing of securing straps 24 and 26 for both frontward and rearward facing configurations is shown. In the rearward facing configuration of FIG. 1 each securing strap extends frontward through a respective opening 44 from the interior to the exterior of the child car seat. Each strap then extends along an outer portion of the child car seat toward respective anchors 28 and 30. This strap routing from interior to exterior of the child car seat aids in preventing lateral movement of the child car seat 10 relative to the vehicle seat. In the frontward facing configuration of FIG. 2, each strap 24 and 26 extends rearward through an opening 46 in the side portion 18 and/or back portion 16, and then along an exterior rear portion of the child car seat 10 to the anchors 28 and 30. Similar to the rearward configuration, this strap routing from interior to exterior of the child car seat aids in preventing lateral movement of the child car seat 10 relative to the vehicle seat.

Figure 4:
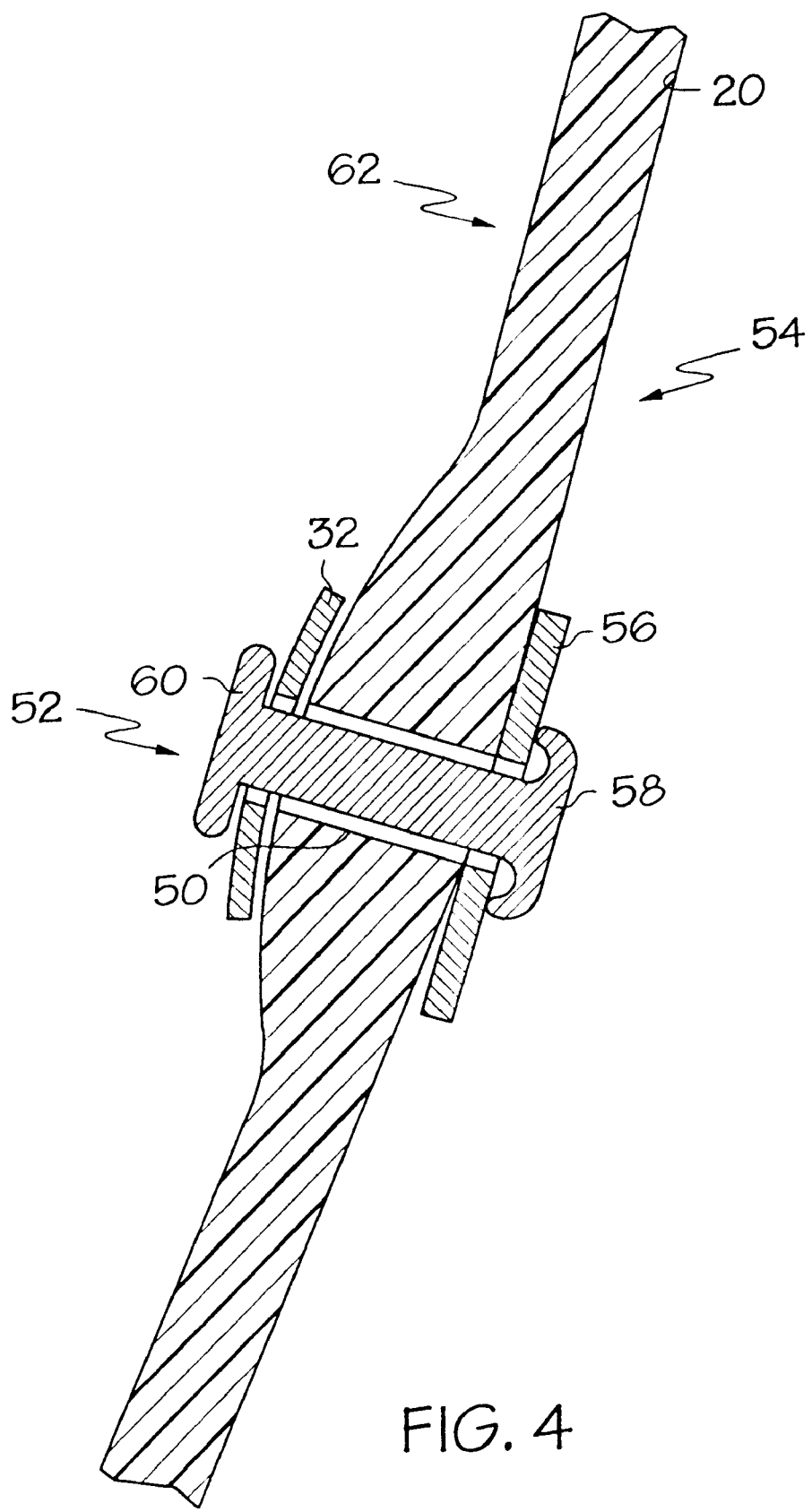
FIG. 4 is an enlarged partial cross-sectional view along line 4—4 of FIG. 3A.

The cross-sectional view of FIG. 4 shows one possible pivotable connection for the mount plate 32. In particular, a hole 50 through side portion 20 is shown having an attachment member 52 extending therethrough. Attachment member 52 is shown as a rivot, but could be another type of member such as a bolt or pin. At an exterior side 54 of side portion 20, a washer 56 may be provided against which the exterior end 58 of member 52 rests. Interior end 60 of member 52 is spaced from the interior side 62 of side portion 20 to allow the mount plate 32 to be positioned therebetween with member 52 extending through a hole in mount plate 32. Sufficient space is provided to allow the mount plate 32 to rotate or pivot about member 52. Notably, side portion 20 may be formed with an increased wall thickness around the connection point to strengthen the connection if necessary.

Figure 5:
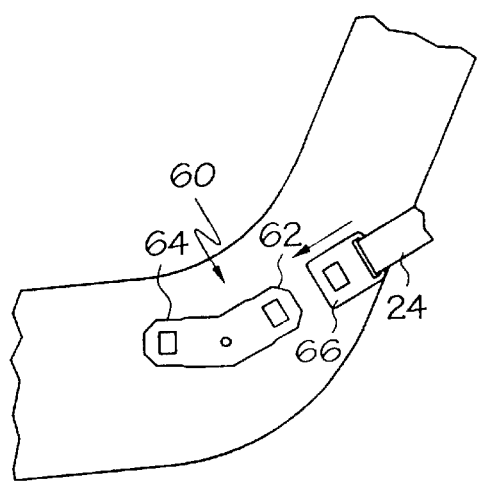
FIGS. 5–9 show alternative attachment structures.
Figure 6:
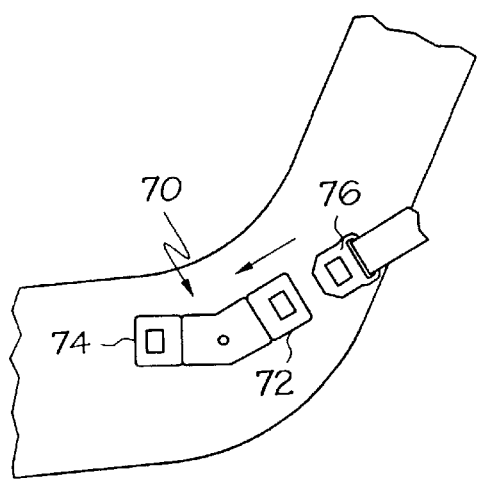
Figure 7:
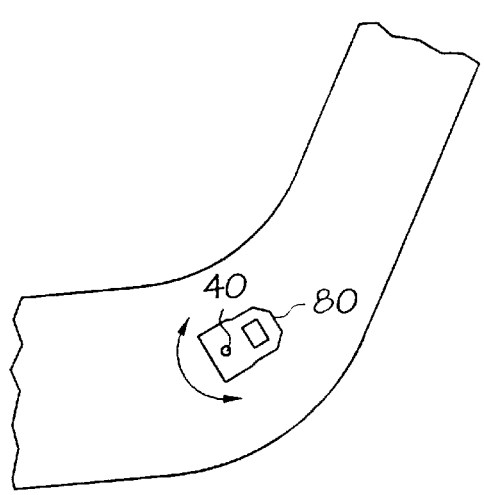
Figure 8:
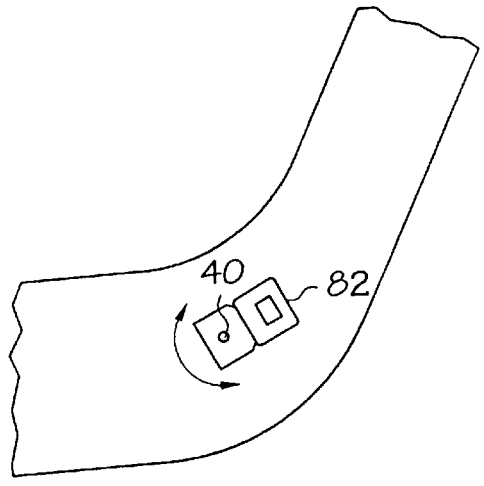
Figure 9:
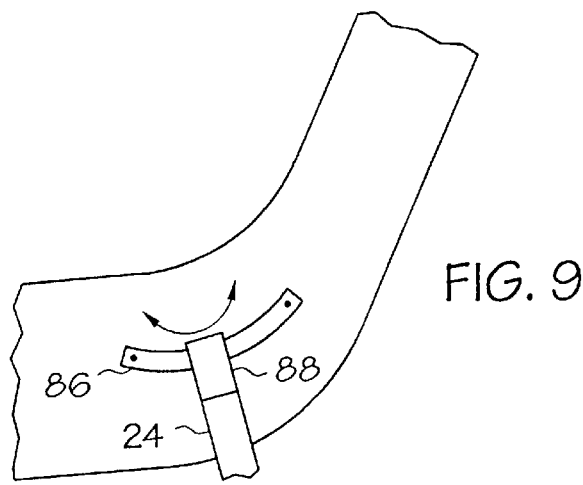

FIGS. 5–9 illustrate alternative structures which could be utilized for connecting the straps at an interior location on the child car seat. Referring to FIG. 5, a dual buckle tongue assembly 60 is connected to the side portion of the child car seat such that one tongue 62 extends rearward and one tongue 64 extends frontward. The tongues connect to a buckle box 66 at the end of strap 24. FIG. 6 shows a dual buckle box assembly 70 connected to the side portion of the child car seat such that one buckle box 72 extends rearward and one buckle box 74 extends frontward. The buckle boxes receive a buckle tongue 76 at the end of the strap. FIGS. 7 and 8 show a pivotably connected buckle tongue 80 and a pivotably connected buckle box 82 respectively. FIG. 9 shows a rod or strap 86 connected at its ends to the child car seat. The strap 24 includes a slider member 88 at its end which loops around the rod or strap 86 to enable the strap 24 to be slid frontward or rearward as desired. Slider member 88 may be a loop of webbing material, for example. Further variations are possible, including pivotably mounted metal loops for connecting to an attachment hook at the end of the strap, or multiple metal loops.

All of the above structures, as well as others could be utilized to mount straps interiorly on the child car seat in a manner that enables the straps to extend both frontward and rearward. While the illustrated embodiments show the mounting positions along the side portions of the child car seat, it is recognized that many of the advantages could be achieved by mounting the straps at other interior locations on the child car seat and all such interior mounts are considered to be within the scope of the broader aspects of the invention.

Figure 10:
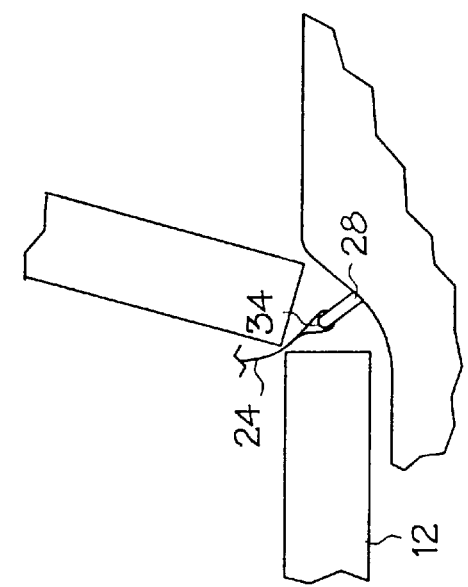
FIG. 10 is a partial side elevational view of a car including anchors positioned interior of the line of engagement between the back portion of the seat bottom and the bottom portion of the seat back.

FIG. 10 illustrates the relative position of the anchors with respect to the vehicle seat 12, the anchors being positioned inward of the line of contact between the back of the seat portion and the bottom of the back portion. As shown in the front elevation of FIG. 11, each anchor 28 may be of a generally U-shaped configuration which is welded to a relatively stable portion of the vehicle. Of course, other configurations of the anchors might be provided and the child car seat described herein would be equally useful with such anchors.

In order to more reliably attach each securing strap 24 and 26 to the car seat 10 it is preferred that a wall thickness of the side portion 18 and 20 of the car seat 10 in the area of the connection point be greater than that of more outlying areas of each respective side portion 18 and 20 as previously noted with respect to FIG. 4. Likewise, the wall thickness of the seat portions in the region around the openings 44 and 46 where the straps extend, may also be formed with a greater thickness than other portions for added strength as necessary. Alternatively, the region around the openings 44 and 46 could be strengthened, if necessary, by securing strengthening plates therearound using, for example, an adhesive or attachment members such as bolts, screws or rivots. It is contemplated that in one embodiment the car seat 10 would be formed of a molded plastic material as is known in the art. However, other materials and techniques could be used to form a suitable car seat in accordance with the present invention.

Figure 12:
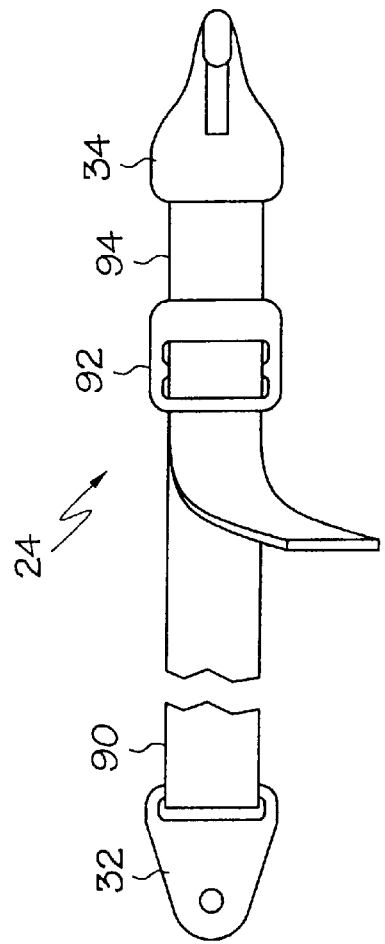
FIG. 12 is an illustration of an exemplary securing strap.

Each securing strap 24 and 26 is preferably adjustable in length to enable the child car seat 10 to be tightly secured to automobiles having varying seat configurations. In this regard, reference is made to FIG. 12 which illustrates one possible embodiment of such an adjustable securing strap 24 where the securing strap 24 includes a first portion 90 connected to the attachment plate 32 and extending to an adjustment buckle 92. A second strap portion 94 extends between the buckle 92 and the attachment hook 34. The overall length of the securing strap 24 can be adjusted by adjusting the length of the strap portion 90 extending between plate 32 and buckle 92 as is known in the art. Although use of an attachment plate 32 is shown in the primary embodiment, it is recognized that, with a strap of suitable strength the strap could be directly connected to the interior side portion of the car seat by, for example, using an eyelet associated with the strap.

It is also recognized that typically a seat in accordance with the present invention may include a padded, removable seat cover as is known in the art and in such cases the portions of the securing straps routed interiorly would preferably be positioned beneath the seat cover.

While the forms of the apparatus herein described constitute preferred embodiments of the invention, it is to be understood that the invention is not limited to these precise forms of apparatus, and changes may be made therein without departing from the scope of the invention.

What is claimed is:

1. A child car seat for installation in a vehicle including anchor points, the car seat mountable to an automobile seat in both a frontward facing configuration and a rearward facing configuration, comprising:

an exterior portion and an interior portion, the interior portion defining a receiving area for a child, a front area of the interior portion being generally open and a rear area of the interior portion being generally closed by a back section;

first means positioned on the interior portion for securing a first seat securing strap thereto such that the first seat securing strap is positioned interiorly of the seat and is capable of extending both toward the front area and the back area;

second means positioned on the interior portion for securing a second seat securing strap thereto such that the second strap is positioned interiorly of the seat and is capable of extending both toward the front area and the rear area;

wherein, when mounted in the frontward facing configuration the first and second seat securing straps extend toward the rear area for attachment to respective vehicle anchor points; and wherein, when mounted in the rearward facing configuration the first and second seat securing straps extend toward the front area for attachment to respective vehicle anchor points.

2. The child car seat of claim 1, further comprising:

a first opening extending from the interior portion to the exterior portion of the seat and positioned toward the frontward area, a second opening extending from the interior portion to the exterior portion of the seat and positioned toward the rearward area, a third opening extending from the interior portion to the exterior portion of the seat and positioned toward the frontward area, and a fourth opening extending from the interior portion to the exterior portion of the seat and positioned toward the rearward area;

wherein when mounted in the frontward facing configuration the first and second seat securing straps extend respectively through the second and fourth openings, and wherein when mounted in the rearward facing configuration the first and second seat securing straps extend respectively through the first and third openings.

3. The child car seat of claim 1 wherein the first means comprises a first attachment plate secured to the first seat securing strap, the first attachment plate pivotably mounted to the interior portion of the child car seat, and wherein the second means comprises a second attachment plate secured to the second seat securing strap, the second attachment plate pivotably mounted to the interior portion of the child car seat.

4. The child car seat of claim 1 wherein the first means comprises a first buckle tongue pivotably mounted to the interior portion of the child car seat, and wherein the second means comprises a second buckle tongue pivotably mounted to the interior portion of the child car seat, the first seat securing strap including a first buckle box for matingly attaching to the first buckle tongue and the second seat securing strap including a second buckle box for matingly attaching to the second buckle tongue.

5. The child car seat of claim 1 wherein the first means comprises a first multi-tongue assembly connected to the interior portion of the child car seat and the second means comprises a second multi-tongue assembly connected to the interior portion of the child car seat, the first seat securing strap including a first buckle box for matingly attaching to the first multi-tongue assembly and the second seat securing strap including a second buckle box for matingly attaching to the second multi-tongue assembly.

6. The child car seat of claim 1 wherein the first means comprises a first buckle box pivotably mounted to the interior portion of the child car seat, and wherein the second means comprises a second buckle box pivotably mounted to the interior portion of the child car seat, the first seat securing strap including a first buckle tongue for matingly attaching to the first buckle box and the second seat securing strap including a second buckle tongue for matingly attaching to the second buckle box.

7. The child car seat of claim 1 wherein the first means comprises a first multi-buckle box assembly connected to the interior portion of the child car seat and the second means comprises a second multi-buckle box assembly connected to the interior portion of the child car seat, the first seat securing strap including a first buckle tongue for matingly attaching to the first multi-buckle box assembly and the second seat securing strap including a second buckle tongue for matingly attaching to the second multi-buckle box assembly.

8. The child car seat of claim 1 wherein the first means is pivotably connected to the interior portion of the child car seat and the second means is pivotably connected to the interior portion of the child car seat.

9. A child car seat for installation in an automobile including anchor points, the car seat mountable to an automobile seat in both a frontward facing configuration and a rearward facing configuration, comprising:

a seat portion, a back portion and first and second side portions defining an interior child receiving area;

a first securing strap pivotably connected at an interior position on the first side portion;

a second securing strap pivotably connected at an interior position on the second side portion;

wherein, when mounted in the frontward facing configuration the first and second straps extend from their respective car seat side portions in a rearward direction for attachment to respective anchor points; and wherein, when mounted in the rearward facing configuration the first and second straps extend from their respective car seat side portions in a frontward direction for attachment to respective anchor points.

10. The child car seat of claim 9 wherein the first securing strap includes a first end connected to a first attachment plate and the first attachment plate is pivotably connected to the first side portion of the car seat, and the second securing strap includes a first end connected to a second attachment plate and the second attachment plate is pivotably connected to the second side portion of the car seat.

11. The child car seat of claim 10 wherein the first securing strap includes a second end having a first anchor attachment hook connected thereto, and the second securing strap includes a second end having a second anchor attachment hook connected thereto.

12. The child car seat of claim 9 wherein a first opening is provided in the first side portion toward a front of the child car seat, wherein a second opening is provided in at least one of the first side portion and the back portion near a rear of the child car seat, wherein a third opening is provided in the second side portion toward the front of the child car seat, wherein a fourth opening is provided in at least one of the second side portion and the back portion near the rear of the child car seat, wherein when mounted in the frontward facing configuration the first and second securing straps extend respectively through the second and fourth openings, and wherein when mounted in the rearward facing configuration the first and second securing straps extend respectively through the first and third openings.

13. A child car seat for installation in a vehicle including anchor points, the car seat mountable to an automobile seat in both a frontward facing configuration and a rearward facing configuration, comprising:

an exterior portion and an interior portion, the interior portion defining a receiving area for a child, a front area of the interior portion being generally open and a rear area of the interior portion being generally closed by a back section, a first opening extending from the interior portion to the exterior portion of the seat and positioned toward the front area, a second opening extending from the interior portion to the exterior portion of the seat and positioned toward the rear area, a third opening extending from the interior portion to the exterior portion of the seat and positioned toward the front area, and a fourth opening extending from the interior portion to the exterior portion of the seat and positioned toward the rear area;

first means positioned on the interior portion for securing a first strap thereto such that the first strap is positioned interiorly of the seat and is capable of extending both toward the front area and the back area;

second means positioned on the interior portion for securing a second strap thereto such that the second strap is positioned interiorly of the seat and is capable of facing both toward the front area and the rear area;

wherein, when mounted in the frontward facing configuration the first and second straps extend respectively through the second and fourth openings for attachment to respective vehicle anchor points; and wherein, when mounted in the rearward facing configuration the first and second straps extend respectively through the first and third openings for attachment to respective vehicle anchor points.

\* \* \* \* \*